United States Patent Office

2,977,215
Patented Mar. 28, 1961

2,977,215

ARSENIC REMOVAL AND THE PELLETIZING OF THE DE-ARSENIZED MATERIAL

Kurt Meyer, Frankfurt am Main, Hans Rausch, Oberursel (Taunus), and Karl-Heinz Boss, Bad Homburg vor der Hohe, Germany, assignors to Metallgesellschaft Aktiengesellschaft, Frankfurt am Main, Germany No Drawing. Filed Dec. 1, 1958, Ser. No. 777,199

3 Claims. (Cl. 75—3)

This invention relates to the removal of arsenic from iron ores and other heat-treated products, and to the pelletizing of the de-arsenized material.

A great number of iron-oxide ores and other materials to be roasted are not directly suitable for smeltering unless their arsensic content is first substantially lowered. It is also necessary at times, as in the case of heat-treated products and when the raw material is in a powder form, to render the raw materials lumpy before smeltering. This is generally done by sintering or pelletizing and then heat hardening the pellets.

A common way to remove arsensic from these raw materials is to roast them in a shelved oven or in a rotary tube furnace in the presence of reducing gases such as CO, that is to say in the absence of air. These gases reduce the arsensic and iron present to $As_2O_3$ and $Fe_3O_4$. The $As_2O_3$ volatilizes at temperatures over 600° C. However, the arsensic content of many ores cannot be reduced in this manner sufficiently. In some cases, an arsenic content of at least 0.15 to 0.25 percent remains in the treated ore. This arsensic content would be too high in view of the subsequent steps in the process and commerically unacceptable products would result.

The raw material to be treated should be in a fine-grained form in order to present a large surface area for exposure to the reacting gases. If the raw materials are too coarse the particle size has to be reduced in order to achieve the appropriate particle size before the removal of arsenic. Thus, the treated product is obtained in a fine grained form and has to be made lumpy before proceeding with the smeltering operation.

At the present time, as described in British Patent No. 286,285, the practice in removing arsenic from raw materials having a very high arsenic content, speiss for example, calls for the simultaneous use of a large quantity of pyrite and coal. This procedure produces a product having a residual arsenic content of 2 percent and more. The addition of pyrite is a standard means of treating iron oxide ores and other roasted products. The resulting products, substantially free of arsenic, are commercially valuable. However, this procedure has several drawbacks. Great amounts of pyrite are consumed and pyrite is expensive. Then, too, the use of pyrite results in the formation of a comparatively large amount of $SO_2$. The amount of $SO_2$ formed is not enough to be economically converted, as to $H_2SO_4$, but is still large enough to require some treatment before allowing it to escape into the atmosphere. In treating fine-grained arsenic free raw material, it is made lumpy by a further and separate process of sintering or pelletizing and heat hardening. It has been customary to use sulphurous material, pyrite for example, as solid fuel with an excess of air in this process.

Up to this time, there was no known way to combine the two operations of arsenic removal and the sinter burning of the pellets into a single operation. This was due to the fact that, in order to produce a sulphur free sinter, a very large excess of air was needed. This excess of air caused a further oxidation of the arsenic to arsenate, thus making it difficult to remove the arsenic. On the other hand, if a lesser amount of air were used in order to facilitate the complete removal of the arsenic, there resulted an incomplete combustion of the sulphur and the residual sulphur content of the finished sintered product was too high.

Furthermore, as previously mentioned, this procedure had the added disadvantage of using great quantities of pyrite, amounting to at least 15 percent, and usually up to 25 percent of the raw material to be treated.

The use of a carbonaceous fuel for sintering does not lend itself to a satisfactory removal of the arsenic present. The highest volatilizing values established to date using carbonaceous fuel for the sintering process are about 50 to 70 percent. This resulting sinter cake is not suitable for further metallurgical treatment.

This invention relates to a single process for the removal of arsenic from iron ores and residual ores from other processes which could not otherwise be freed of their arsenic content by treatment with reducing gases to the extent that the residual arsenic content is below 0.1 percent, generally about 0.05 percent. The term iron ore is to be understood as containing oxidic and carbonatic natural iron ores, residues of the roasting of sulphidic iron ores and oxidic, hydroxidic and carbonatic iron containing byproducts of the chemical and metallurgical industries. This invention does not require the sole use of reducing gases, thus eliminating installation and operative costs for such gas production. This new process calls for the use of much less pyrite than is required in the known processes. The amount of pyrite needed is only 1 to 4 percent of the charged arsenic containing raw materials.

It is possible to so control the arsenic removing process that the arsenic free product emerges in a fine-grained form. This is desirable if, for instance, this arsenic free product is to be subsequently charged into a bloomery-system furnace rather than in a blast furnace. The bloomery-system produces iron in a rotary furnace using solid carbonaceous matter as a reducing agent. In a modification of this invention it is also possible to combine the two operations of arsenic removal and pelletizing into a single operation. There would then result a sinter cake or pellets, as the case may be, which is satisfactorily free of arsenic and sulphur and also mechanically stable.

This invention is based upon the surprising discovery that the chemical change of the arsenic contaminated iron ores to $Fe_3O_4$ and $As_2O_3$ is carried out much faster and more completely in a solid phase than in a gas phase. Then, too, this simultaneous use of sulphidic and carbonaceous reducing fuels results in a more complete chemical change than would occur by the use of only one of these reducing agents. A necessary condition for the success of this process is the maintenance of as neutral an atmosphere as is possible. At most, the atmosphere can be weakly oxidizing or weakly reducing. It might be advisable to maintain a weakly reducing atmosphere to prevent, absolutely, a strongly oxiding atmosphere. The maintenance of a strongly reducing atmosphere does not create any advantages. In a strong reducing atmosphere, the reactions would proceed at least partially in the gas phase. This would tend to lessen the advantages gained by the use of an entirely solid phase reaction, that is the speed and completeness of the reaction. The invention thus calls for the roasting of the arsenic contaminated raw materials in a weakly reducing but as neutral an atmosphere as in possible.

The raw materials are mixed with enough solid reducing agents as is necessary to reduce the iron ore present to $Fe_3O_4$. This solid reducing agent is a mixture of a low amount of pyrite and carbonaceous fuel. The preferable carbonaceous fuels are those with adequate reducing qualities such as anthracite coal, brown coal, or charcoal. These fuels are used in this new process in much smaller quantities than in other currently known similar processes. About 1 to 4 percent pyrite and 2 to 4 percent practically pure carbon such as anthracite coal or proportionately larger amounts of inferior types of carbonaceous fuels are the amounts of fuel used in this process.

Under the conditions of this invention, a fuel mixture of one-third pyrite and two-thirds anthracite coal has shown an added quality of being especially reactive.

The amount of pyrite added can be lowered or the addition of pyrite can be eliminated altogether if the raw material contains sulphur in the form of a sulphide or a sulphate, which would be reduced to a sulphide in an intermediary step by the carbonaceous fuel element. Another modification of the invention allows the combining into one operation of the arsenic removal from the raw material and the pelletizing of the resulting arsenic free material. It has been discovered that the simultaneously controlled combustion of a carbonaceous fuel, such as coke, with a sulphidic fuel, such as pyrite, would result in practically all the iron present being reduced to $Fe_3O_4$. The combustion is controlled by a properly adjusted air flow through the combustion area. There results a complete volatilization of the arsenic present, in the form of $As_2O_3$, and the leaving of a sinter cake with a sulphur content of at most about 0.3 percent, but usually below 0.1 percent. The reaction time necessary in the process for the removal of the arsenic is only 15 to 20 minutes, and the total time needed for both the arsenic removal and the sintering step is only 20 to 40 minutes. This time element thus involved is both technically and economically very feasible even on the sintering band.

If the arsenic removal and sintering or heat hardening of pellets are to be accomplished in a single operation, it will be necessary to increase the amount of carbonaceous fuel to be added to allow for the extra heat needed. About 7 to 10 percent anthracite coal or correspondingly larger amounts of inferior carbonaceous fuels would suffice. This added heat could be supplied by solid fuels or hot gases. It would be possible to replace about one-third of the solid fuel with hot combustion gases in the sintering process.

Where arsenic is to be removed from pellets and the de-arsenized material is to be heat hardened in a single operation, it is more advisable to use only as much of the pyrite-anthracite fuel mixture as is necessary for the removal of the arsenic and to rely on hot gases to supply the heat necessary to heat harden the pellets of the de-arsenized material. This process of arsenic removal and heat hardening of pellets can be carried out in different types of suitable apparatuses, for example, in a shaft furnace, rotating tube furnace, or also on a sintering band.

In order to maintain a neutral atmosphere when the operation is carried out on a sintering band using solid fuels and a blast of air, it is necessary to considerably throttle the quantity of air drawn through the sinter bed as compared with the conventionally used amounts of air. In this invention, volumes of air of the order of 5 to 10 m.$^3$/m.$^2$/m. (cubic meters per square meter of sinter bed surface per minute) are used as compared with the conventionally used quantities of 30 to 80 m.$^3$/m.$^2$/minute and particularly 40 to 50 m.$^3$/m.$^2$/minute.

In keeping with another modification of this invention, it is not necessary to maintain such a stringent throttling of the quantity of air put through the sinter band during the entire operation time. It is sufficient that the quantity of air put through the sinter bed be maintained at the reduced level of 5 to 10m.$^3$/m.$^2$/minute for about one-half of the total time needed for the process. Thereafter, the quantity of air put through the sinter bed is substantially increased, even in excess of the conventionally used quantities without affecting the arsenic volatilization. This subsequent increasing of the air flow through the sinter bed to over 50 and preferably even to 70 to 80 m.$^3$/m.$^2$/minute enables the process to be maintained within technically and economically acceptable limits, as, for example, about 5 to 10 tons of finished material a day per square meter of sintering surface, in spite of the low quantities of air used in the initial stages of the process.

The following examples are given of the invention:

EXAMPLE I

*Arsenic removal only without rendering lumpy*

The raw material used in this example is a roasted flotation pyrite containing 1.7 percent As and 1.48 percent residual sulphur and had the following sieve analysis:

| | Percent |
|---|---|
| Over 0.2 mm | 5 |
| 0.09–0.2 mm | 31 |
| 0.06–0.09 mm | 21 |
| <0.06 mm | 43 |

500 grams of this raw material are mixed with 4 percent anthracite and 2 percent unroasted flotation pyrite and is treated for 15 minutes in an electrically heated rotating tube furnace at a temperature range of 900 to 950° C. in a nitrogen atmosphere. The resulting product has an arsenic content below 0.04 percent and a residual sulphur content of 0.12 percent.

EXAMPLE II

*Removal of arsenic and rendering lumpy of the de-arsenized material by sintering on a grate with the use only of solid fuels*

The same raw material is used here as is used in Example I. The following mixture is made up and mixed with water in an Eirich mixer:

15 kg. roasted product (raw material from Example I)
15 kg. recycle material, 0–8 mm.
3.25 kg. brown coal, 0–6 mm.
0.6 kg. pyrite This mixture is placed on a sintering grate having an area of 40 x 40 cm. and after ignition the suction upon the grate was set so that during the burning of the mixture the exhaust gas from the grate was throttled down to a maximum of from 5 to 10 m.$^3$/m.$^2$ of sinter bed surface per minute. When the combustion was completed, the sinter cake was cooled by drawing through large quantities of cooling gases amounting to from 80 to 120 m.$^3$/m.$^2$ of sinter bed surface per minute. The finished sintered product has an arsenic content of less than 0.05 percent and a sulphur content of about 0.3 percent.

EXAMPLE III

*Removal of arsenic and rendering lumpy by sintering on the sinter grate using solid fuels and hot gases to supply the necessary heat*

A mixture of the following ingredients was mixed in an Eirich mixer as in Example II:

15 kg. roasted material (raw material from Example I)
7.5 kg. recycled material
2.0 kg. brown coal
0.6 kg. pyrite The quantity of hot gas drawn through the sintering bed is throttled down to 5 to 10 m.$^3$/m.$^2$ sinter bed surface per minute. The quality of the finished sinter product is better with the simultaneous use of hot gases and solid fuel than that obtained under normal sintering conditions as is evidenced by the small amount of recycled material.

The arsenic content of the sintered material is also below 0.05 percent and the sulphur content about 0.17 percent.

EXAMPLE IV

*Removal of arsenic and rendering lumpy by means of hardening of the pellets on the sinter grate and using substantially only hot gases to supply the necessary heat*

The roasted pyrite of Example I is pelletized on a granulating disc with the addition of 4 percent pyrite and 6 percent brown coal. The pellets have a diameter of from 10 to 20 mm. These green pellets are placed in a layer 35 cm. thick superimposed upon a base 10 cm. thick composed of previously burned recycled pellets and resting on a grate having an area 40 x 40 cm. Hot gases with no oxygen are drawn through this sintering bed and produce a burning temperature of 1230° C. The sintered pellets are then air cooled. These finished pellets have an arsenic content of 0.08 percent and a sulphur content of 0.2 percent.

Having now described the means by which the objects of the invention are obtained, we claim:

1. A process for preparing from arsenic contaminated iron ore lumpy material suitable for reduction in a blast furnace by simultaneously making lumps of and removing arsenic from said ore comprising forming a mixture of iron ore, 2 to 4% of carbonaceous fuel and 1.0 to 4.0% of sulphidic fuel from finely ground ingredients, reacting said fuel with said ore in a substantially neutral atmosphere in a solid phase maintained process until the arsenic content is reduced to less than 0.1% and the sulphur content to about up to 0.3% of said iron ore, and providing additional heat during said reaction at a temperature above 950° C. and sufficient for simultaneously forming mechanically stable lumps agglomerated from said finely ground ingredients.

2. A process as in claim 1, further comprising additionally heating said mixture by drawing hot gases through said mixture to sinter said ore.

3. A process as in claim 1, further comprising pelletizing said mixture before burning said fuel.

References Cited in the file of this patent

UNITED STATES PATENTS

| | | |
|---|---|---|
| 1,984,747 | Klencke | Dec. 18, 1934 |
| 2,867,529 | Forward et al. | Jan. 6, 1959 |

FOREIGN PATENTS

| | | |
|---|---|---|
| 286,285 | Great Britain | June 21, 1928 |